United States Patent [19]

Chan et al.

[11] Patent Number: 5,525,889
[45] Date of Patent: Jun. 11, 1996

[54] DIRECT PLUG-IN CORDLESS SCREWDRIVER

[75] Inventors: Ka M. Chan; Wai W. Chung, both of Kowloon, Hong Kong

[73] Assignee: GSL Rechargeable Products Limited, Kowloon, Hong Kong

[21] Appl. No.: 524,364

[22] Filed: Sep. 6, 1995

Related U.S. Application Data

[63] Continuation of Ser. No. 219,832, Mar. 30, 1994, abandoned.

[51] Int. Cl.$^6$ ............................. H01M 10/44; B25G 1/00
[52] U.S. Cl. .................................. 320/2; D8/61; 173/217
[58] Field of Search ........................ 320/2; 219/225; 81/436, 438; 7/105; D8/82, 83, 85, 86, 87, 61; 173/217

[56] References Cited

U.S. PATENT DOCUMENTS

| | | | |
|---|---|---|---|
| D. 295,601 | 5/1988 | Svetlik | D8/61 |
| D. 304,543 | 11/1989 | Somers et al. | D8/61 |
| D. 308,622 | 6/1990 | Fushiya et al. | D8/61 |
| D. 322,205 | 12/1991 | Liu | D8/61 |
| D. 325,503 | 4/1992 | Kikuchi et al. | D8/61 |
| 3,458,794 | 7/1969 | Bohnstedt et al. | 320/2 |
| 4,075,458 | 2/1978 | Moyer | 219/225 |
| 4,101,757 | 7/1978 | Van Dyck et al. | 219/225 |
| 4,228,343 | 10/1980 | Kanner et al. | 219/225 |
| 4,522,270 | 6/1985 | Kishi | 173/163 |
| 4,794,315 | 12/1988 | Pederson et al. | 320/2 |
| 4,857,702 | 8/1989 | Cafaro | 219/225 |

*Primary Examiner*—Robert Nappi
*Attorney, Agent, or Firm*—Longacre & White

[57] ABSTRACT

The present disclosure concerns a cordless electric screwdriver which incorporates its own set of male electric power tangs for direct connection to a standard, household power socket. The tangs are extended or retracted from the ergonomically designed housing by virtue of communal mounting upon a carriage which is movably supported by the housing. Further, by orienting the projection of the extended tangs to be centered on a line passing through the center of gravity for the screwdriver, the screwdriver is facilitated to endure extended periods of support solely by the tangs being "plugged-in" to the household power socket. The ergonomic design features of the housing include a combination of surface texturing as well as relative cross-section sizing and shaping.

9 Claims, 4 Drawing Sheets

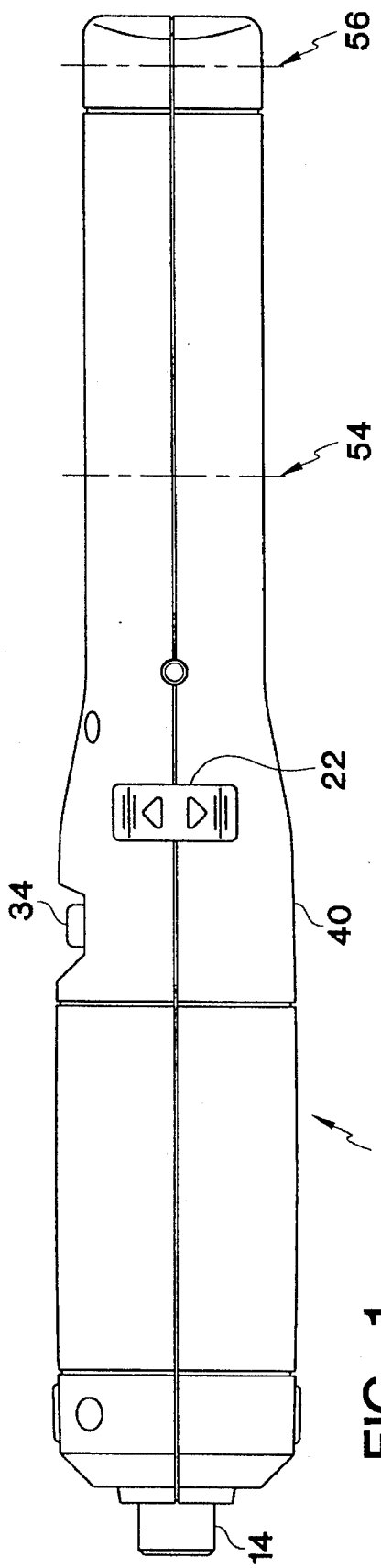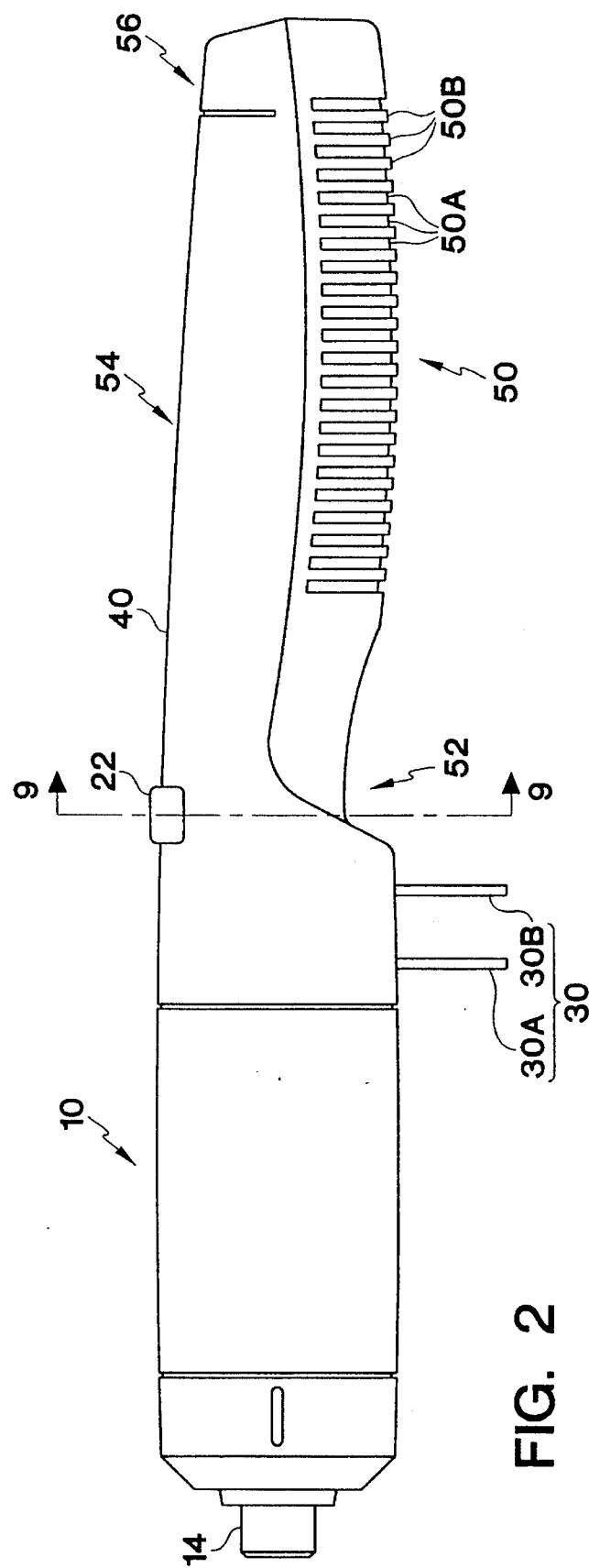
FIG. 1
FIG. 2

5,525,889

DIRECT PLUG-IN CORDLESS SCREWDRIVER

This is a continuation of application Ser. No. 08/219,832, filed Mar. 30, 1994, which was abandoned upon the filing hereof.

BACKGROUND OF THE INVENTION a) Field of the Invention

The invention concerns a cordless electric appliance. In particular, the present invention concerns a cordless electric screwdriver which includes provisions for plugging the screwdriver directly into a standard electrical power socket.

b) Description of Related Art

Conventional electric screwdrivers are either of the "corded" or the "cordless" variety. Corded electric screwdrivers are electrically linked to a power source socket by finite length wire conductors. By convention, the electrical contact tangs of a male plug-in connector are associated with an electrical appliance, and each tang is respectively received in a female electrical contact of a power source socket. Also by convention, the electrical contact tangs and female electrical contacts are arranged in a standardized pattern to facilitate mating between the plug and socket. A disadvantage of corded screwdrivers is the range of operation is limited to the finite length of the wire conductors from the power source socket. Another disadvantage is the added bulk and inconvenience a cord causes in tight spaces.

Conventional cordless electric screwdrivers include an internal power reserve. The internal power reserve may be provided by standard, non-rechargeable batteries, however the most common power reserve is one or more rechargeable batteries. During periods of screwdriver inactivity, the rechargeable batteries may be linked to a power source socket through a recharging unit.

Known recharging units for cordless electric screwdrivers generally consist of either a rectifying transformer unit which is simultaneously "plugged-in" between both a standard electrical power source socket and an input receptacle on the screwdriver, or a support bracket which cradles the screwdriver and concurrently establishes electrical links between the bracket and the screwdriver. Consequently, it is necessary to have either the rectifying transformer unit or the support bracket to recharge the screwdriver.

Inasmuch as it is not always convenient to carry an additional rectifying transformer unit or support bracket for recharging the cordless electric screwdriver, having a separate, secondary element becomes a disadvantage.

SUMMARY OF THE INVENTION

An object of the present invention is to provide an electrical appliance from which male electrical contact tangs are arranged to directly project. In particular, it is an object of the present invention to provide a cordless, rechargeable screwdriver having male electrical contact tangs extended directly from the housing for the rechargeable screwdriver. In a further embodiment of the present invention, the projection of the tangs is along a line which passes through the center of gravity for the appliance.

Another object of the present invention is to provide retractable male electrical contact tangs mounted on a common support. Specifically, it is an object of the present invention to commonly mount a pair of electrical contact tangs on a carriage supported for relative motion with respect to the screwdriver housing. Motion of the carriage with respect to the housing causes the tangs to be retracted within, or extended from the housing. According to yet a further object of the invention, movement of the carriage concomitantly changes the electrical connections within the electrical appliance.

BRIEF DESCRIPTION OF THE DRAWINGS

FIG. 1 is a plan view of a screwdriver according to the present invention.

FIG. 2 is a left side view of a screwdriver according to the present invention.

DESCRIPTION OF THE PREFERRED EMBODIMENT

Figures 3, 4:
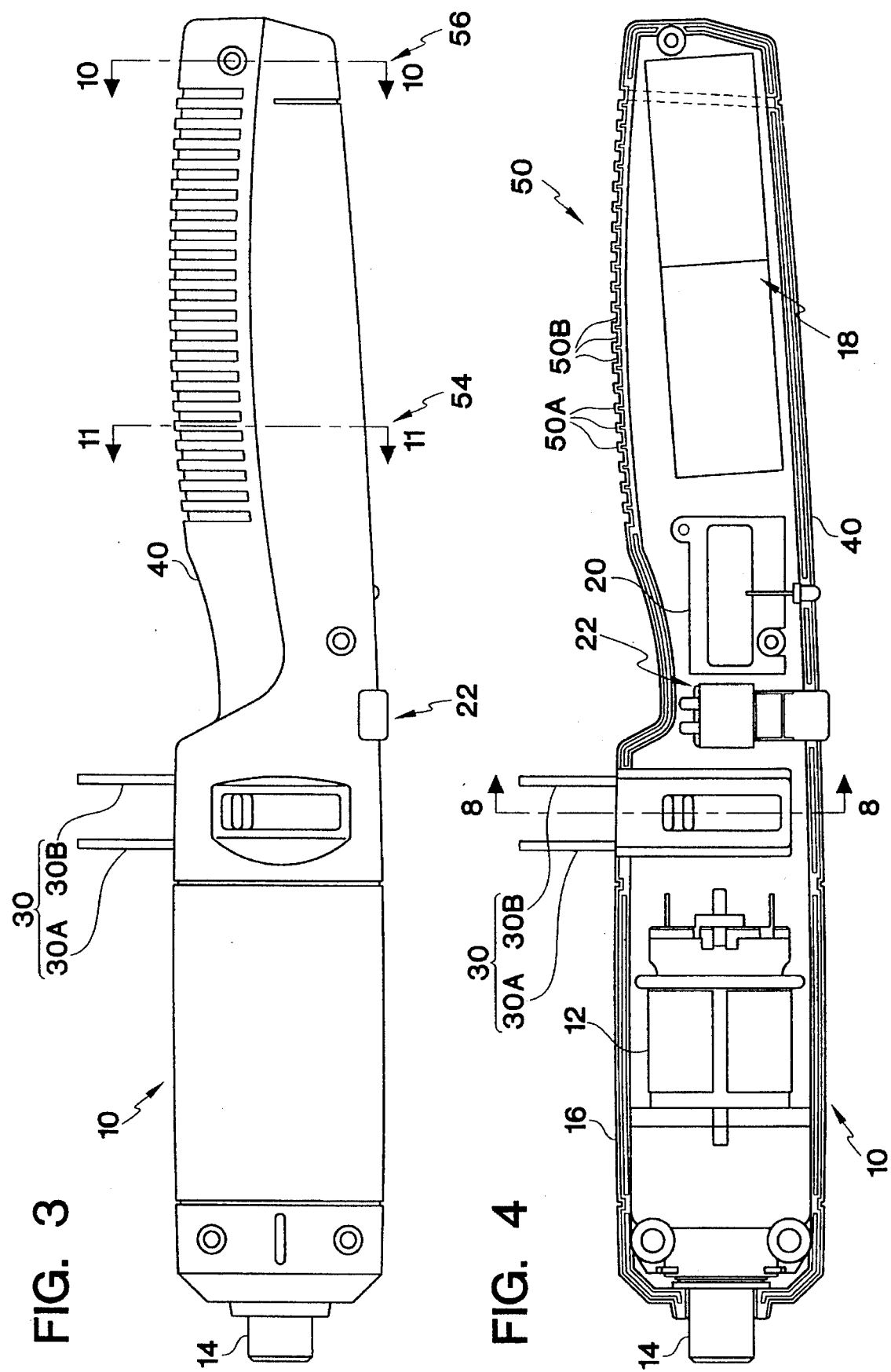
FIG. 3 is a right side view of a screwdriver according to the present invention.
FIG. 4 is a longitudinal section view of a screwdriver according to the present invention.
Figure 7:
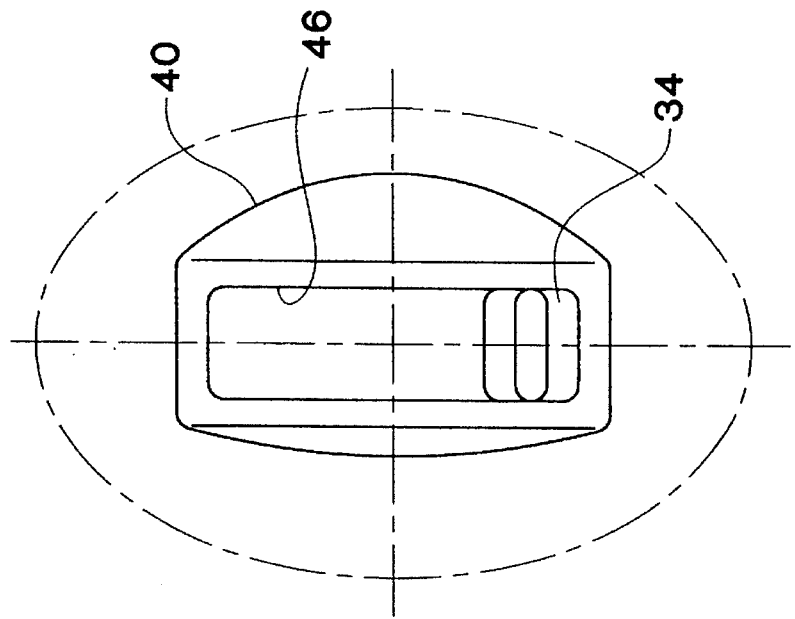
FIG. 7 is an enlarged detail view of a carriage control element according to the present invention.
Figure 6:
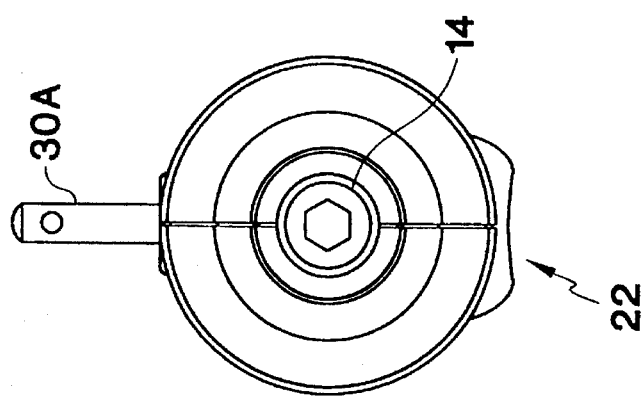
FIG. 6 is a second end view of a screwdriver according to the present invention, with the tangs extended.

According to the present invention, an electric appliance such as a cordless screwdriver 10, comprises a tool such as a direct current motor 12. In a preferred embodiment of the invention, the direct current motor 12 rotates a collet 14 via a reduction gear assembly 16.

An electric storage cell 18 such as one or more batteries provide a source of direct current to the motor 12. In a preferred embodiment of the present invention, the cell 18 is recharged from a conventional, household alternating current voltage source. Specifically, an electrical converter 20 transforms and rectifies the alternating current voltage into the direct current voltage which is stored in the cell 18.

A switch 22 selects operating characteristics of the motor 12 such as clockwise rotation, no rotation, or counter-clockwise rotation. In a preferred embodiment, the switch 22 is a DPDT switch which selectively establishes the electrical connections between the motor 12 and the cell 18, in a conventional manner. It is also possible that the switch 22 could be used to operate a speed control circuit (not shown) and thereby select the rate of rotation, as well as the direction of rotation.

Figure 8:
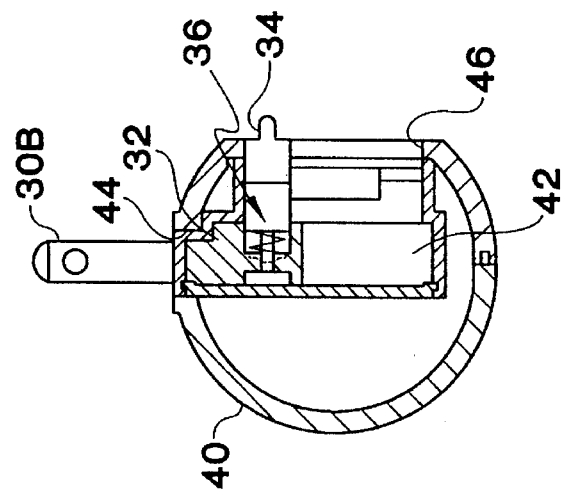
FIG. 8 is a transverse section view, taken along line 8—8 in FIG. 4, showing a carriage according to the present invention.

Tangs 30 establish the physical connection with respective female electrical contacts of a standard, household wall socket. Tangs 30A, 30B are communally mounted on a carriage 32 which is itself relatively movably supported by a housing 40. It is within the scope of this invention that the movement of the carriage 32 can be to translate, pivot, or some combination thereof, with respect to the housing 40. The essence of the motion is to extend the tangs 30 to a first position wherein they are adapted to engage a standard, household wall socket, and to retract the tangs 30 to a second position within a recess 42 in the housing 40. The tangs 30 extend through a first aperture(s) 44 out of the recess 42, while a control element 34 associated with carriage 32 can extend through a second aperture 46 out of the recess 42. The control element 34 is engaged by an individual's digit for the purpose of moving the carriage 32 with respect to the housing 40, and consequently extending or retracting the tangs 30. The illustrated preferred embodiment of FIG. 8 shows carriage 32 relatively translatable with respect to the housing 40. FIG. 8 also shows an interlock mechanism 36 which requires overcoming the opposing force of a spring loaded catch before the carriage 32 can be moved out of the first or second positions.

Another important aspect of the present invention is the location of the extended tangs 30 with respect to the center of gravity for the electric appliance 10. Specifically, the projection of the tangs 30, while in the first position, is centered on a line which passes through the center of gravity for the appliance 10. This location for the tangs 30 minimizes stress on the tangs 30, carriage 32 and housing 40 during recharging (likely to be long periods of support by virtue of being "plugged-in" to a household wall socket). Yet another aspect of the present invention is the potential safety feature obtained by movement of the carriage 32 that concomitantly electrically disconnects the tangs 30 from the converter 20. That is to say, the motion of carriage 32 with respect to housing 40 can act like a switch to electrically isolate the tangs 30 in the second position, or when not in the first position.

Figure 5:
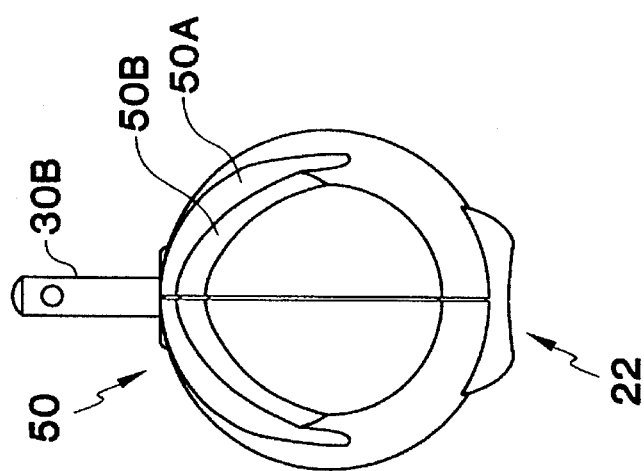
FIG. 5 is a first end view of a screwdriver according to the present invention, with the tangs extended.
Figure 11:
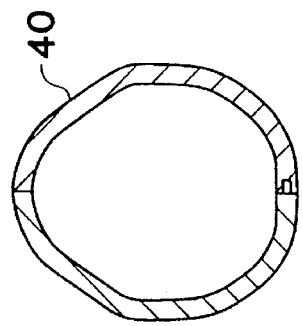
FIG. 11 is a transverse section view, taken along line 11—11 in FIG. 3, showing ergonomic contours according to the present invention.
Figure 10:
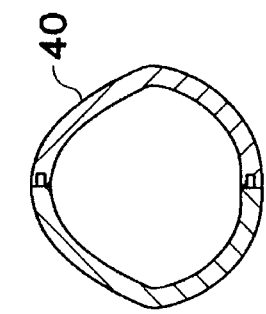
FIG. 10 is a transverse section view, taken along line 10—10 in FIG. 3, showing ergonomic contours according to the present invention.
Figure 9:
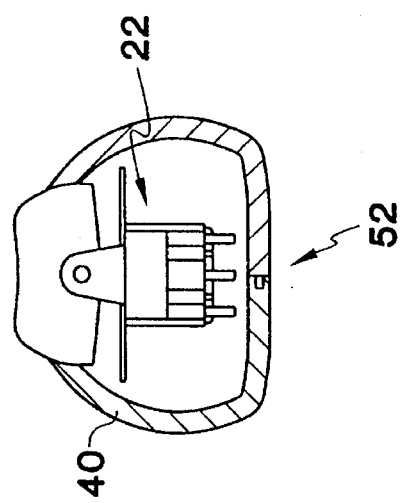
FIG. 9 is a transverse section view, taken along line 9—9 in FIG. 2, showing a switch according to the present invention.

The housing 40 supports the direct current motor 12, collet 14, reduction gear assembly 16, electric storage cell 18, electrical converter 20, switch 22, tangs 30, carriage 32, control element 34 and interlock mechanism 36. However, another important aspect of present invention is the configuration of the housing 40. In order to provide improved ergonomics to the appliance 10, several features have been incorporated into the design of the housing 40. A plurality of adjacent ridges 50A and valleys 50B comprise a textured section 50 of the housing 40 which only partially circumscribes the longitudinal axis of the housing. As best shown in FIG. 5, the textured section 50 is generally located diametrically opposite to the circumferential position of the switch 22. Additional facets of the housing 40 include a constricted portion 52, as well as distinct cross-sectional profiles illustrated in the preferred embodiments shown in FIGS. 9–11. As a consequence of the constricted portion 52, the cross-section illustrated in FIG. 9 has the distinctively flattened profile. Additionally, an intermediate portion 54 of the housing interposed between the constricted portion 52 and an end portion 56, has the relatively expanded cross-section illustrated in Figure 11 as compared with the cross-section of the end portion 56 illustrated in FIG. 10. The textured section 50 and the constricted portion 52, as well as the relative sizing and shape of the intermediate and end portions 54,56, each contribute to the overall ergonomics improvement provided by the present invention.

In an alternate embodiment to the present invention, access 41 (FIG. 4) is provided through the housing 40 for the purpose of separating the electric storage cell 18 from the appliance 10. That is to say, a plurality of interchangeable cells 18 could be maintained and sequentially connected to the appliance 10 as preceding cells 18 are exhausted.

What is claimed is:

1. An electrical handheld cordless screwdriver which is recharged by directly engaging a wall socket supplying household voltage through a pair of female electrical contacts, said cordless screwdriver comprising:

an elongated housing comprising a gripping section, a motor section and an intermediate section located between said gripping section and said motor section;

a motor requiring an operation voltage, said motor being located in said motor section;

electrical storage cell means for retaining a charge obtained from the household voltage, said storage cell means located within said gripping section;

switch means for selecting operating characteristics of said screwdriver, said switch means positioned on a top side of said housing at a transition between said gripping section and said intermediate section;

a pair of male electrical contacts supplying the household voltage to the cordless screwdriver, said male contacts are sized and positioned to be received in the female contacts; and, a carriage communally supporting said pair of male contacts, said carriage is movably supported by said housing within said intermediate section, wherein said carriage is moved to a first position in which said male contacts are extended from a bottom side of said housing during recharging, said bottom side being opposite said top side, and said carriage is moved to a second position in which said male contacts are retracted within said intermediate section during operation of said screwdriver, and wherein the extension of said male contacts in said first position is substantially centered on a line passing through the center of gravity for said cordless screwdriver, and a control element projecting from said intermediate section, wherein shifting said control element causes said carriage to move in a linear direction between said first and second positions, wherein said gripping section includes a contoured digit receiving recess formed adjacent to said intermediate section and opposite said switch means, said digit receiving recess defining a cross-sectional radius which is smaller than said motor section.

2. The cordless screwdriver according to claim 1, wherein said gripping section comprises a variable cross-sectional radius along its longitudinal direction, said digit receiving recess defining the smallest cross-sectional radius of said gripping section.

3. The screw driver according to claim 1, wherein said housing includes an access through which said electrical storage cell means is separated from said appliance.

4. The screw driver according to claim 1, wherein movement of the carriage by the control element is regulated by an interlock mechanism.

5. The screw driver according to claim 1, wherein the supply of the household voltage to the electric appliance from said male contacts is interrupted in said second position.

6. The screw driver according to claim 1, wherein the household voltage is supplied through said male contacts only in said first position.

7. The screw driver according to claim 1, wherein said gripping section includes a plurality of ridges circumscribing only a portion of the circumference of said housing.

8. The screw driver according to claim 1, further comprising:

electrical converter means for converting the household voltage to said operating voltage, said converter means is also supported within said housing and is electrically interposed between said male contacts and said storage cell means.

9. The screw driver according to claim 1, wherein said male contacts extend through a first aperture in a first direction and said control elements project through a second aperture in a second direction, said first direction being substantially perpendicular to said second direction.

* * * * *